UNITED STATES PATENT OFFICE.

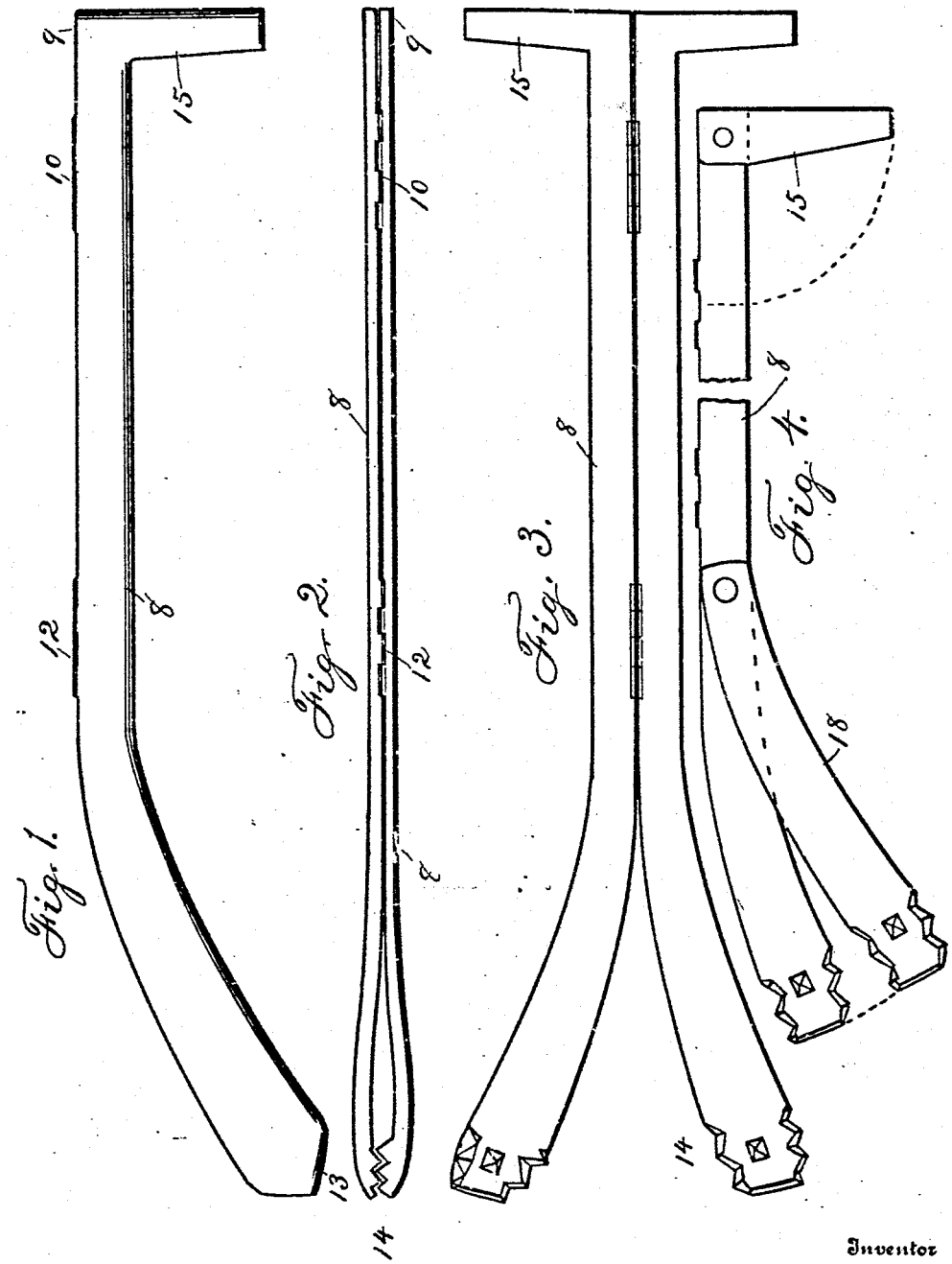

HENRY E. KOCH, OF HARTINGTON, NEBRASKA.

OBSTETRICAL FORCEPS.

No. 899,222.  Specification of Letters Patent.  Patented Sept. 22, 1908.

Application filed January 27, 1908. Serial No. 412,821.

*To all whom it may concern:*

Be it known that I, HENRY E. KOCH, a citizen of the United States, residing at Hartington, in the county of Cedar and State of Nebraska, have invented certain new and useful Improvements in Obstetrical Forceps, of which the following is a specification.

This invention relates to forceps generally, but has especial relation to forceps used in veterinary obstetrics.

It consists in the construction and novel arrangement of parts as will hereinafter be fully described, and particularly pointed out in the claims.

The accompanying drawing illustrates the invention, in which

Figure 1 is a side view of a simple form of the device and having rigid handles. Fig. 2 is an edge view of the form shown in Fig. 1. Fig. 3 is a plan view of the forceps opened, and Fig. 4, is a fragmentary side view of one of the blades having an auxiliary blade attached thereto, and with a foldable handle.

The reference numerals 8, 8, designate the main blades of my forceps. These blades are substantially alike, and are made approximately straight, from the outer end 9, to a point beyond the second hinge 12; from that point the blades are curved downwards, the lower extremity 13 being rounded off as shown, to prevent injury to the parturient animal. The opposite, inner faces, at the operative ends of blades, are provided with short teeth 14, to insure a hold on the animal, when grasped by the forceps.

The hinges 10 and 12, are secured or formed upon the straight upper edges of the blades, and insure an easily controlled opening and closing of the forcep blades, and a swinging movement of the operative ends of the blades, favorable for gently pushing aside interposing objects, and for unerringly seizing the object desired.

Lever handles 15, 15, are attached, at right angles, to the outer ends of the blades 8. These handles may be rigid on the blades 8, (as seen in Figs. 1 and 3,) or have a pivotal or other jointed connection with the blades, (as seen in Fig. 4,) so they may be closed for convenience in carrying.

As above described the device is adapted for assisting in the delivery of pigs, and other small animals. I have also adapted my forceps for use upon the larger animals such as colts and calves by attaching short, adjustable, auxiliary blades 18, to the main blades 8, near to hinge 12, and between it and the operative ends of the blades 8. These blades 18 are also provided with short teeth 14, and generally agree in contour with the curved portions of the blades 8.

When the instrument is used upon the larger animals, these short blades are opened out as shown in Fig. 4, but when the instrument is used upon the smaller animals, the blades 18 are closed in against the inner faces of the main blades, as indicated by the dotted line.

I do not limit myself to the exact forms of hinges or joints shown in the drawings, but reserve the right to adopt other, equivalent means, which come within the scope of the claims.

Having now described the invention, what I claim and desire to secure, is—

1. Forceps comprising two blades approximately straight in their jointed portions and curved in their operative portions, and hinges secured upon said blades and connecting together an adjacent edge of each of said blades as herein set forth.

2. Forceps composed of two blades having curved operative portions, hinges connecting their approximately straight, adjacent edges, lever handles on the outer ends of said blades, and teeth on the inner surfaces of the operative ends of said blades, as herein set forth.

3. Forceps composed of two blades having curved operative portions, hinges connecting their approximately straight adjacent edges and adjustable lever handles on the outer ends of said blades as described.

4. Forceps comprising two main blades hinged together at an approximately straight adjacent edge of each blade and having a curved operative portion, and auxiliary blades adjustably attached to said main blades as herein set forth.

5. Forceps composed of two blades hinged together at an approximately straight adjacent edge of each blade and having a curved operative portion whose lower extremity is rounded off, as herein described.

In testimony whereof I affix my signature, in presence of two witnesses.

HENRY E. KOCH.

Witnesses:
W. H. STEPHENSON,
R. F. KOCH.